United States Patent
Sakamoto

(10) Patent No.: US 9,836,130 B2
(45) Date of Patent: Dec. 5, 2017

(54) OPERATION INPUT DEVICE, OPERATION INPUT METHOD, AND PROGRAM

(71) Applicant: nextEDGE Technology K.K., Ibaraki (JP)

(72) Inventor: Taisuke Sakamoto, Ibaraki (JP)

(73) Assignee: NextEDGE Technology K.K. (JP)

( * ) Notice: Subject to any disclaimer, the term of this patent is extended or adjusted under 35 U.S.C. 154(b) by 64 days.

(21) Appl. No.: 14/896,975

(22) PCT Filed: Jul. 6, 2015

(86) PCT No.: PCT/JP2015/069451
§ 371 (c)(1),
(2) Date: Dec. 9, 2015

(87) PCT Pub. No.: WO2016/103769
PCT Pub. Date: Jun. 30, 2016

(65) Prior Publication Data
US 2016/0370865 A1   Dec. 22, 2016

(30) Foreign Application Priority Data
Dec. 26, 2014  (JP) ................................ 2014-264546

(51) Int. Cl.
*G06F 3/01* (2006.01)
*G06F 3/048* (2013.01)
(Continued)

(52) U.S. Cl.
CPC ................ *G06F 3/017* (2013.01); *G06F 3/01* (2013.01); *G06F 3/033* (2013.01); *G06F 3/0346* (2013.01); *G06F 3/048* (2013.01); *G06F 3/0481* (2013.01); *G06F 3/0485* (2013.01); *G06F 3/04812* (2013.01); *G06F 3/04845* (2013.01);
(Continued)

(58) Field of Classification Search
None
See application file for complete search history.

(56) References Cited

U.S. PATENT DOCUMENTS

2011/0057875 A1* 3/2011 Shigeta .................. G06F 3/011
345/156
2014/0089849 A1   3/2014 Choi et al.

FOREIGN PATENT DOCUMENTS

JP       2011028366 A    2/2011
JP       2011054118 A    3/2011
(Continued)

OTHER PUBLICATIONS

Japanese Patent Application No. 2014-264546, Office Action dated May 19, 2015 together with English translation.

*Primary Examiner* — Kenneth B Lee, Jr.
(74) *Attorney, Agent, or Firm* — Hayes Soloway PC

(57) ABSTRACT

A hand/finger image detector (112) detects a hand/finger image presenting a hand or finger of an operator from a frame image captured by a camera. An operation region specifier (113) specifies an operation region from a field of view of the camera based on the position or size of the hand/finger image in the entire frame image A region map maker (114) maps the specified operation region on a display region. Then, an operation input signal creator (115) detects change in the position, size, or shape of the hand/finger image in the mapped operation region, and creates and outputs an operation input signal based on the change.

11 Claims, 14 Drawing Sheets

(51) Int. Cl.
*G06F 3/0481* (2013.01)
*G06F 3/0485* (2013.01)
*G06F 3/0346* (2013.01)
*G06F 3/033* (2013.01)
*G06F 3/0484* (2013.01)
*G06K 9/00* (2006.01)
*G06K 9/20* (2006.01)

(52) U.S. Cl.
CPC ....... *G06K 9/00355* (2013.01); *G06K 9/2081* (2013.01); *G06F 2203/04806* (2013.01)

(56) References Cited

FOREIGN PATENT DOCUMENTS

| | | | |
|---|---|---|---|
| JP | 2011175617 A | 9/2011 | |
| JP | 2011243031 A | 12/2011 | |
| JP | 2012-238293 A | 12/2012 | |
| JP | 2014241099 A | 12/2014 | |

\* cited by examiner

OPERATION INPUT DEVICE, OPERATION INPUT METHOD, AND PROGRAM

TECHNICAL FIELD

The present disclosure relates to an operation input device, operation input method, and program for entering information regarding operations of an operator into an information device.

BACKGROUND ART

In recent years, a number of operation input devices for an operator to enter his operations into an information device in a non-contact manner have been developed. Non-contact operation input devices have been drawing attention as means for reducing the operation workload of the operator and making it possible to operate an information device in the middle of work at sites of surgery, cooking, and the like.

Some of such operation devices are, for example, designed to capture with a camera and analyze an image of the operator and enter the operation into the information device based on image analysis results (for example, Patent Literature 1).

The operation control device described in the Patent Literature 1 detects a hand or the like moving as the user makes a motion with a stereo camera, identifies the motion of the hand or the like, and moves the cursor in the display region according to the identified motion. This operation control device moves the cursor and cursor movable region based on the motion of a first detection target, and moves only the cursor within the cursor movable region based on the motion of a second detection target. It is stated that this configuration makes it possible to operate an operation target intuitively and highly accurately.

The applicant of the present application has also filed an input device executing operation input based on images of an operator captured by a camera (for example, Patent Literature 2). The input device described in the Patent Literature 2 captures images of the operator with two juxtaposed video cameras and measures the distance between the video cameras and a hand or finger of the operator. The motion of the hand or finger is detected when the measured distance falls within a preset acceptable range of depth. According to the detection results, a virtual cursor is moved within the display screen, or various operations such as selection and other operations are identified and operation input signals are created. As a result, it is made possible to distinguish between the operator and background noise and create accurate operation input signals.

CITATION LIST

Patent Literature

Patent Literature 1: Unexamined Japanese Patent Application Kokai Publication No. 2011-28366; and
Patent Literature 2: Unexamined Japanese Patent Application Kokai Publication No. 2012-238293.

SUMMARY OF INVENTION

Technical Problem

According to the technique described in the Patent Literature 1, first and second detection targets are detected and the cursor or cursor movable region is moved according to their motions, whereby the process to trace the two detection targets is cumbersome. Furthermore, the operator has to conduct operations with attention to the first and second detection targets, whereby some mismatch between the operators intuition of operation and the motion of the cursor occasionally occurs.

Whereas, the input device described in the Patent Literature 2 has a problem that an inoperative region occurs on the display screen when the operator changes position within the photographing space of the camera or when the operator conducts operations without acknowledging the field of view of the camera.

Furthermore, in the case of an operation input device having a simple configuration using a single camera, the distance in the sight line direction of the camera cannot be measured, whereby it is difficult to detect the motion of a hand or the like of the operator with accuracy when the operator positions himself differently.

The present disclosure is made with the view of the above circumstances and an objective of the disclosure is to provide an operation input device and the like making possible intuitive operation input matching the operators intuition of operation regardless of the position of the operator.

Solution to Problem

In order to achieve the above objective, the operation input device according to a first exemplary aspect of the present disclosure comprises:

a display;

a camera capturing an image of an operator;

a hand/finger image detector acquiring a frame image captured by the camera, and detecting a hand/finger image presenting a hand or finger of the operator from the frame image;

an operation region specifier specifying an operation region in which the operators operation is effective from a field of view of the camera based on the position or size in the frame image of the hand/finger image detected by the hand/finger image detector;

a region map maker mapping the operation region specified by the operation region specifier on a display region of the display, and creating mapping information presenting the correspondence of coordinates between the operation region and the display region; and an operation input signal creator converting the coordinates in the operation region of the hand/finger image detected by the hand/finger image detector to the coordinates in the display region using the mapping information, and creating an operation input signal presenting the operators operation input based on the position or size or shape of the hand/finger image at the converted coordinates.

The operation region specifier may identify as the operation region a region in which the hand/finger image is present from regions in which the image changes exceeding a predetermined limit in multiple consecutive frame images.

The hand/finger image detector may divide the frame image into a predetermined number of divided regions, search the divided regions in sequence, and detect the hand/finger image.

The hand/finger image detector may enlarge or reduce the image in the divided regions to detect the hand/finger image when the hand/finger image is not detected in the divided regions.

The region map maker may conduct the mapping in the manner that the enlargement ratio of the display region to the operation region is increased from the center of the operation region to the ends of the operation region, and create mapping information presenting the correspondence of coordinates between the operation region and the display region.

The region map maker may assume in the operation region an array of points arrayed on a convex plane at certain intervals and projected from the convex direction, array the same number of points as the points assumed in the operation region in the display region at certain intervals, and create mapping information associating the coordinates of the points arrayed in the operation region with the coordinates of the points arrayed in the display region.

The operation input signal creator may convert the coordinates of the hand/finger image in the operation region to the coordinates in the display region of the display using the mapping information, and display a cursor at the converted position of the hand/finger image.

The operation input signal creator may display the cursor in a fashion that makes it possible to recognize that the operators hand is moving when the operation input signal creator detects change in the position of the hand/finger image, and display the cursor in a fashion that makes it possible to recognize that the operator has conducted a click operation when the operation input signal creator detects a given change in the shape of the hand/finger image.

The hand/finger image detector may detect two of the hand/finger images from the frame image, and the operation input signal creator may create the operation input signal for rotation about a Z-axis perpendicular to the display surface of the display or for scrolling up or scrolling down when the two hand/finger images detected by the hand/finger image detector relatively change in the coordinates in the vertical direction of the display.

The hand/finger image detector may detect two of the hand/finger images from the frame image, and the operation input signal creator may create the operation input signal for rotation about a Y-axis that runs in the vertical direction of the display or for zooming in or zooming out when the two hand/finger images detected by the hand/finger image detector relatively change in size.

Furthermore, the operation input method according to a second exemplary aspect of the present disclosure is an operation input method for a computer connected to a camera and a display to enter an operation of an operator based on a hand/finger image presenting a hand or finger of the operator captured by the camera, comprising:

a hand/finger image detection step of acquiring a frame image captured by the camera, and detecting a hand/finger image presenting a hand or finger of the operator from the frame image;

an operation region specification step of specifying an operation region in which the operator's operation is effective from a field of view of the camera based on the position or size in the frame image of the hand/finger image detected in the hand/finger image detection step;

a region mapping step of mapping the operation region specified in the operation region specification step on a display region of the display, and creating mapping information presenting the correspondence of coordinates between the operation region and the display region; and an operation input signal creation step of converting the coordinates in the operation region of the hand/finger image detected in the hand/finger image detection step to the coordinates in the display region using the mapping information, and creating an operation input signal presenting the operator's operation input based on the position or size or shape of the hand/finger image at the converted coordinates.

Furthermore, the program according to a third exemplary aspect of the present disclosure allows a computer connected to a camera and a display to function as:

a hand/finger image detector acquiring a frame image captured by the camera, and detecting a hand/finger image presenting a hand or finger of an operator from the frame image;

an operation region specifier specifying an operation region in which the operator's operation is effective from a field of view of the camera based on the position or size in the frame image of the hand/finger image detected by the hand/finger image detector;

a region map maker mapping the operation region specified by the operation region specifier on a display region of the display, and creating mapping information presenting the correspondence of coordinates between the operation region and the display region; and an operation input signal creator converting the coordinates in the operation region of the hand/finger image detected by the hand/finger image detector to the coordinates in the display region using the mapping information, and creating an operation input signal presenting the operator's operation input based on the position or size or shape of the hand/finger image at the converted coordinates.

Advantageous Effects of Invention

The present disclosure makes possible intuitive operation input matching the operator's intuition of operation regardless of the position of the operator.

DESCRIPTION OF EMBODIMENTS

Embodiment 1

Embodiment 1 of the present disclosure will be described in detail with reference to the drawings.

Figure 1:
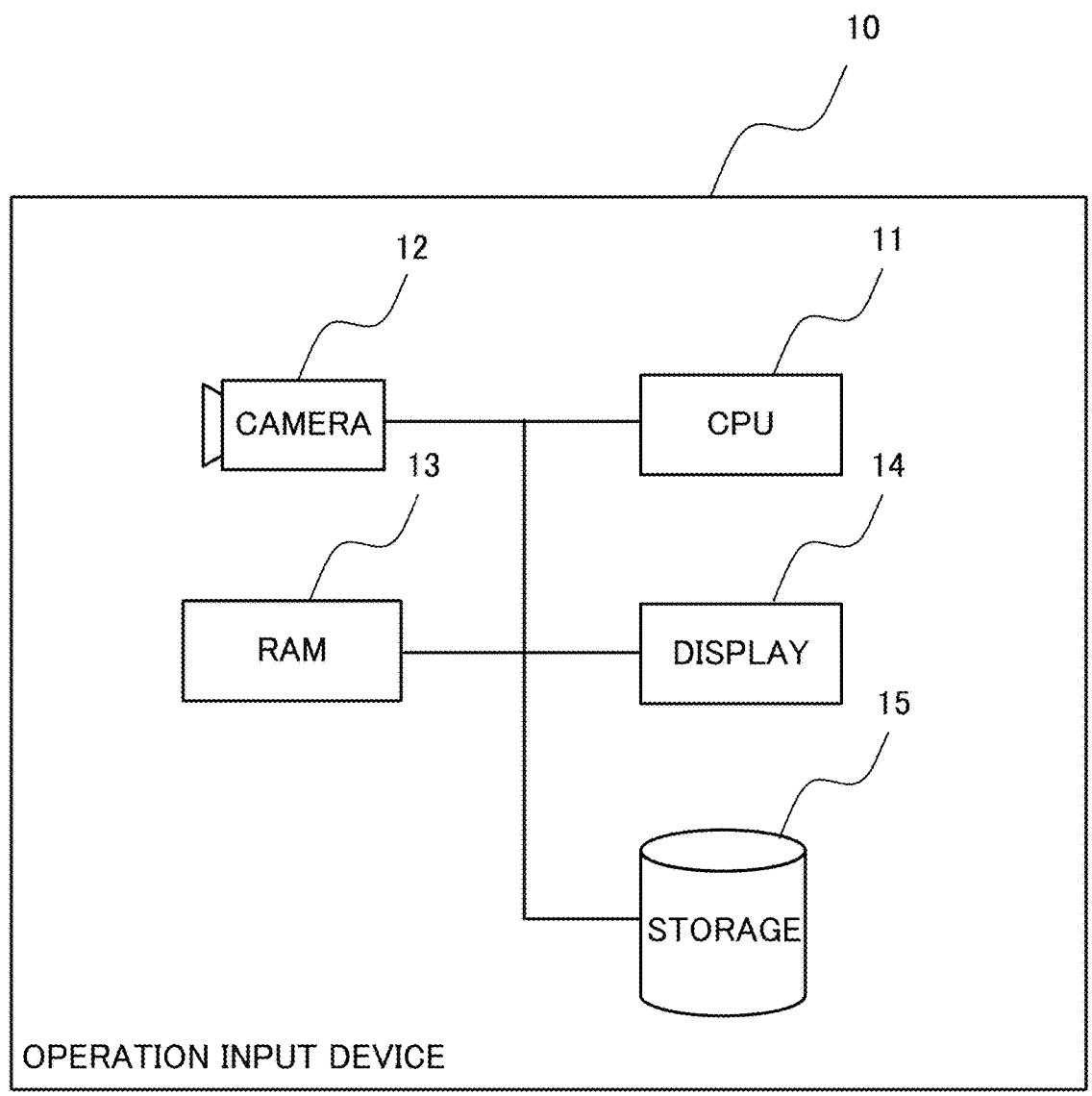
FIG. 1 is a block diagram showing the hardware configuration of the operation input device.

An operation input device 10 according to this embodiment is an information processing device conducting process based on operation input signals created by identifying the operator's operations. As shown in FIG. 1, the operation input device 10 comprises a central processing unit (CPU) 11, a camera 12, a random access memory (RAM) 13, a display 14, and a storage 15.

The operation input device 10 is configured by any information processing terminal such as a personal computer, smartphone, tablet-type terminal, and the like on which the operation input processing program is installed. The camera 12 may be a web camera built in the above information processing terminal or an externally-connected camera.

The camera 12 is a color camera outputting color image data on a real time basis. The camera 12 is installed with its sight line direction oriented nearly perpendicularly to and extending away from the display surface of the display 14, and installed, for example, on the upper edge of the display 14.

The RAM 13 is a high speed data readable/writable memory and temporarily stores image data captured by the camera 12, image data read from the storage 15, and the like for data processing executed by the CPU 11.

The display 14 is a display device executing information display output of images, characters, and the like, and displays images and the like created by the CPU 11. The storage 15 is a large capacity storage device and configured by a flash memory or the like. The storage 15 stores image data captured by the camera 12 and data of images created through processing of the CPU 11. Furthermore, the storage 14 stores programs executed by the CPU 11.

Figure 2:
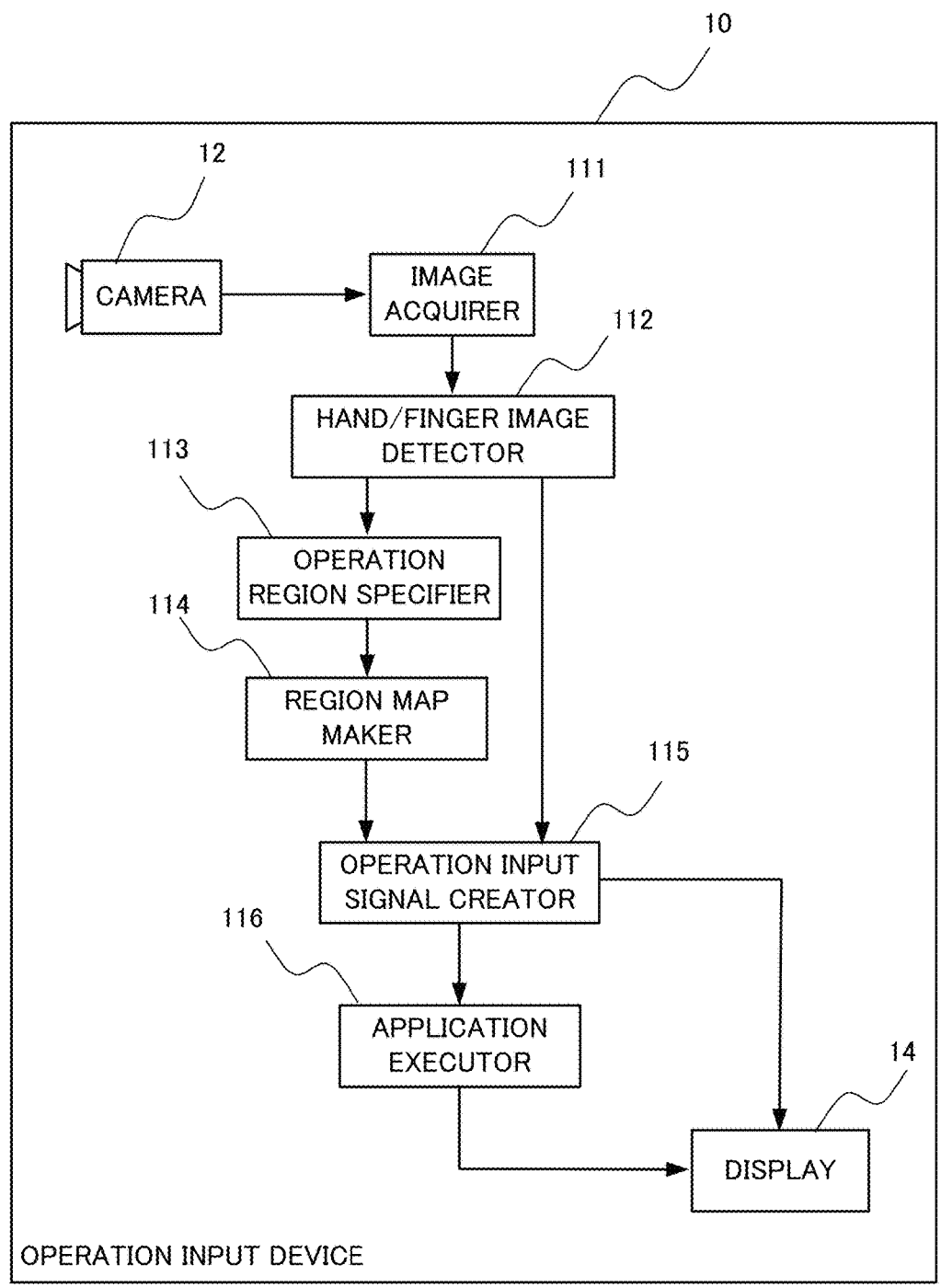
FIG. 2 is a functional block diagram showing the functional configuration of the operation input device.

Executing the operation input processing program stored in the storage 14, the CPU 11 and the RAM 13 function as, as shown in FIG. 2, an image acquirer 111, a hand/finger image detector 112, an operation region specifier 113, a region map maker 114, an operation input signal creator 115, and an application executor 116.

The image acquirer 111 acquires image data captured by the camera 12. The image acquirer 111 outputs a frame image at a given time contained in the image data captured by the camera 12 to the hand/finger image detector 112 at predetermined time intervals.

The hand/finger image detector 112 detects a hand/finger image presenting a hand or finger of a person from the frame image entered from the image acquirer 111, and acquires information of the size and position of the detected hand or finger. Any prior art method of detecting a hand/finger image of a hand or finger of a person can be used. This embodiment is described with the case in which an image of an opened hand 101 including the palm is detected.

For example, a color mask is applied to the frame image entered from the image acquirer 111 to extract a color image of a preset particular color (for example, a skin color). Furthermore, the frame image is binarized. The logical sum of the color-masked and extracted image and binarized image obtained in the above processing may be obtained to detect an image of the hand 101 in a skin color portion.

Alternatively, an image of the hand 101 may be detected by obtaining the difference between the frame images of two or more consecutive frames or the frame images of two or more binarized frames, creating a histogram from the obtained difference images, and identifying an active area in which the motion changes largely.

Alternatively, an image of the hand 101 may be detected by pre-storing a template of a hand or finger in the storage 15 and conducting template matching on the frame image entered from the image acquirer 111.

Information of the size, position, shape, and the like of the hand 101 detected by the hand/finger image detector 112 is output to the operation region specifier 113 and the operation input signal creator 115.

The operation region specifier 113 specifies an operation region 1002 for the operator to use for operations from a field of view of the camera 1001 corresponding to the entire frame image acquired by the image acquirer 111 based on information of the size, position, shape, and the like of the hand 101 entered from the hand/finger image detector 112. The operation region specifier 113 specifies an operation region for the operator to conduct operations with one hand and an operation region for the operator to conduct operations with two hands separately.

First, an example of the method of specifying an operation region for the operator to conduct operations with one hand will be described using FIG. 3. A frame image (field of view of camera 1001) acquired by the image acquirer 111 contains an image of the operator. The operation region specifier 113 acquires a width W of the hand 101 and a center position $P_1$ of the hand 101 entered from the hand/finger image detector 112. Then, the operation region specifier 113 specifies an operation region 1002 having the center at the point $P_1$ and a width of m×W. Here, m is a predetermined positive coefficient and may be changed by the user.

Next, an example of the method of specifying an operation region for the operator to conduct operations with two hands will be described using FIG. 4. A frame image (field of view of camera 1001) acquired by the image acquirer 111 contains an image of the operator. The operation region specifier 113 acquires a center position $P_2$ of the right hand 101 and a center position $P_3$ of the left hand 101 entered from the hand/finger image detector 112. Then, the operation region specifier 113 specifies an operation region 1003 having the center at the midpoint between the points $P_2$ and $P_3$ and a width of n×L in which L is the distance between the points $P_2$ and $P_3$. Here, n is a predetermined positive coefficient and may be changed by the user.

The height of the operation region 1002 or 1003 specified by the operation region specifier 113 has a value obtained by multiplying the width determined based on the center positions $P_1$, $P_2$, and $P_3$ of the hand 101 by a given ratio. Information of the operation region 1002 or 1003 specified as described above is output to the region map maker 114.

Figure 5:
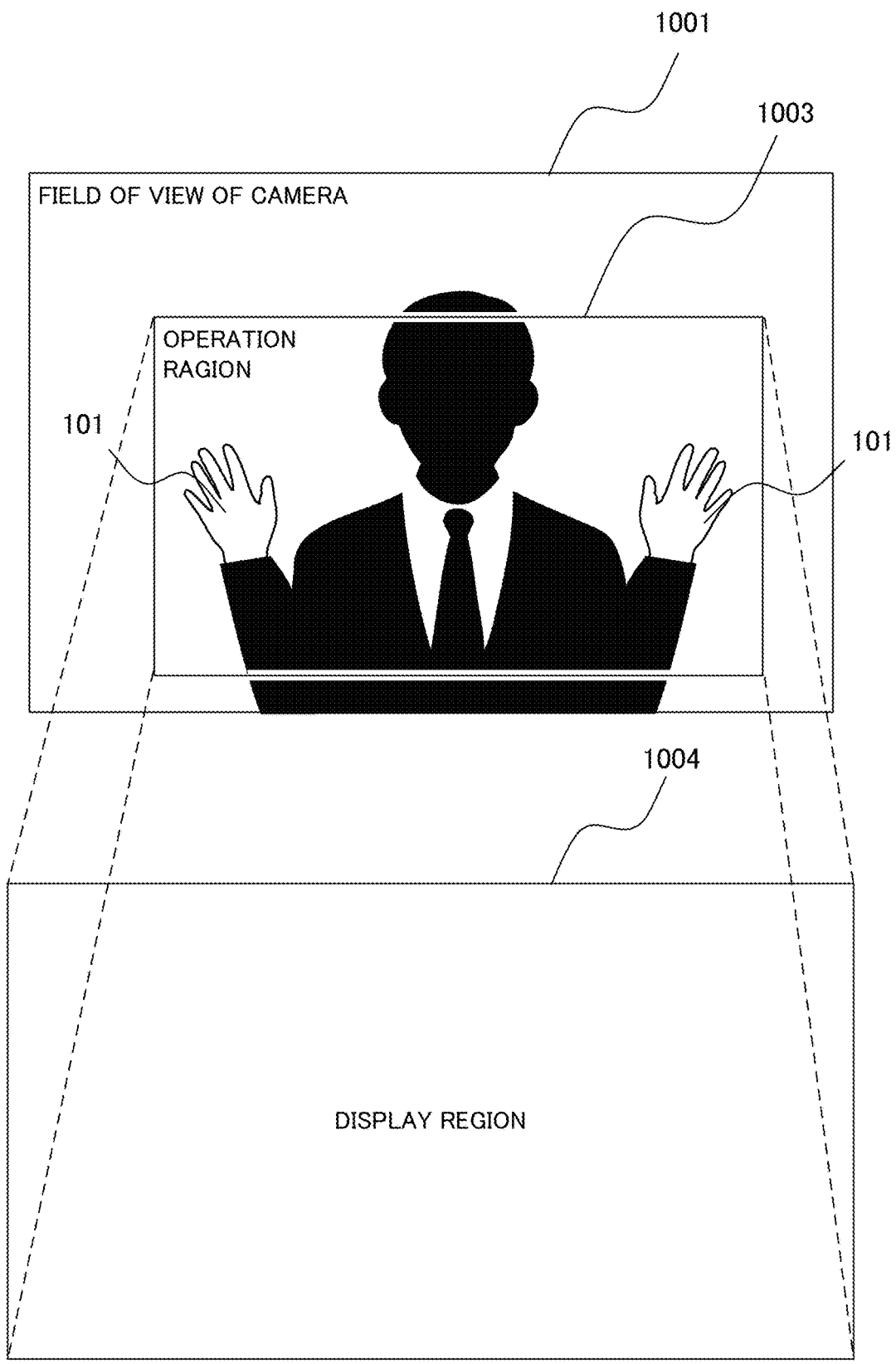
FIG. 5 is an illustration showing the mapping between the operation region and the display region according to Embodiment 1.

The region map maker 114 maps the operation region 1002 or 1003 entered from the operation region specifier 113 on a display region 1004 that is the entire display region of the display 14. FIG. 5 shows the two-hand operation region 1003 mapped on the display region 1004. In other words, the region map maker 114 creates mapping information in which the distances between the coordinates in the operation region 1003 are enlarged with a certain ratio in each of the vertical and horizontal directions and the coordinates in the operation region 1003 are associated with the coordinates in the display region 1004, and outputs the mapping information to the operation input signal creator 115.

The operation input signal creator 115 creates an operation input signal indicated by the operation of the operator based on information of the position or size or shape of the image of the hand 101 detected by the hand/finger image detector 112 or information of change with time in the position or size or shape, and the mapping information created by the region map maker 114.

More specifically, first, the operation input signal creator 115 displays a cursor on the display screen of the display 14. In other words, the operation input signal creator 115 converts the coordinates of the center position of the hand 101 detected by the hand/finger image detector 112 using the mapping information created by the region map maker 114 and displays a cursor at the converted coordinates in the display region 1004.

Subsequently, the operation input signal creator 115 creates an operation input signal ordering selection, execution, or the like of an application presented by an icon or the like displayed on the display 14 according to information of the position or size or shape of the hand 101 detected by the hand/finger image detector 112 or information of change with time in the position or size or shape. Then, the operation input signal creator 115 enters the created operation input signal into the application executor 116.

The application executor 116 selects and executes an application based on the operation input signal entered from the operation input signal creator 115.

The operation input procedure of the operation input device 10 having the above configuration will be described along with the flowchart shown in FIG. 6.

The operation input procedure starts when the hand/finger image detector 112 detects an image of the hand 101. Detecting two hands nearly simultaneously following the state of no detection of the hand 101, in other words starting to detect two hands within a given length of time (Step S101; Yes), the hand/finger image detector 112 sets to the two-hand operation state (Step S102).

Figure 4:
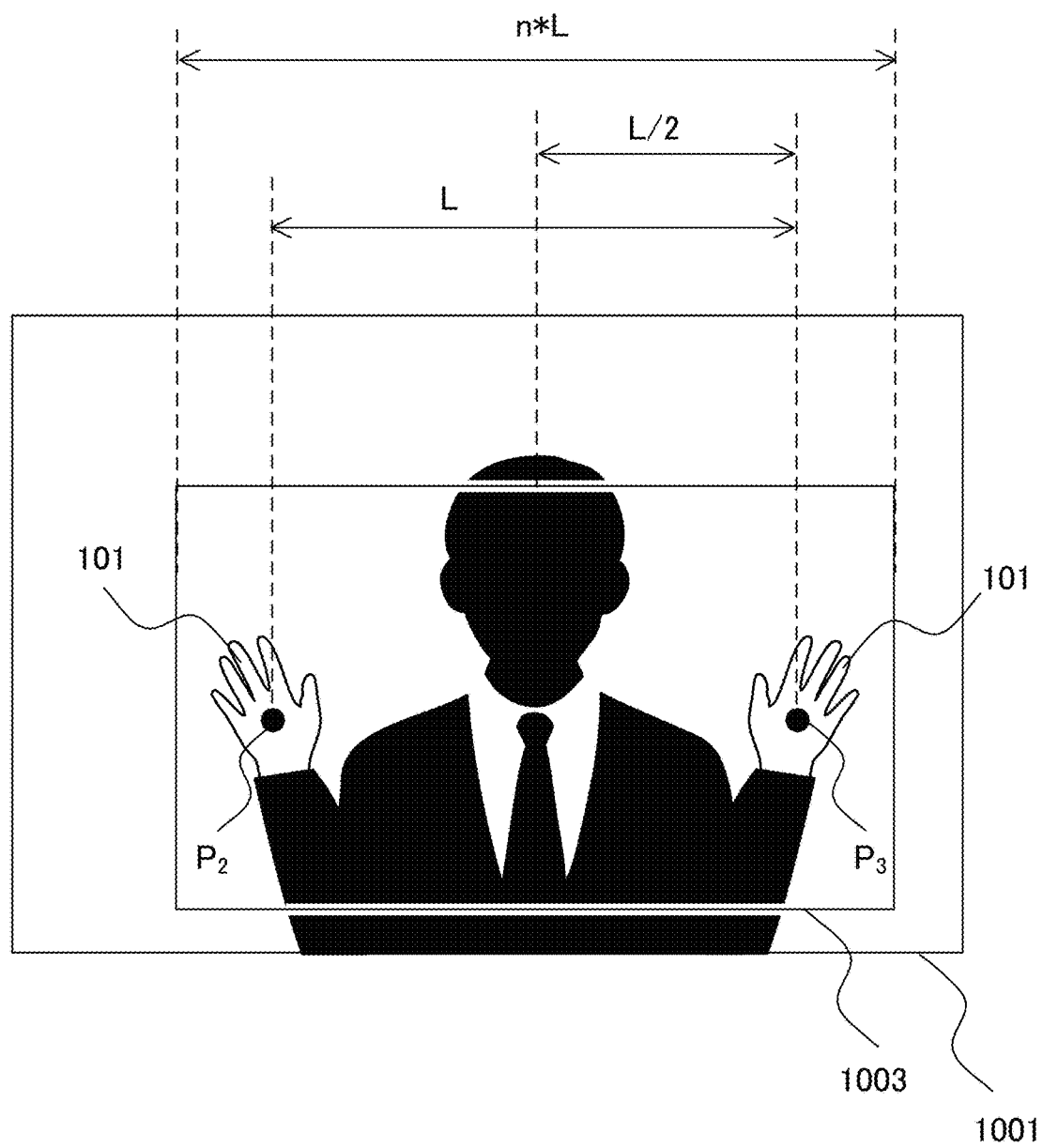
FIG. 4 is an illustration showing an operation region during the two-hand operation.

The operation region specifier 113 specifies a two-hand operation region 1003 as shown in the example of FIG. 4 (Step S103). The region map maker 114 maps the operation region 1003 specified by the operation region specifier 113 on the display region 1004 (Step S104).

Subsequently, the operation input signal creator 115 creates an operation input signal corresponding to change with time in the size, relative position, and shape of two hands in the operation region 1003 mapped on the display region 1004, and outputs the operation input signal to the application executor 116 and the display 14 (Step S105). The display 14 moves the cursor or changes the shape of the cursor and the application executor 116 executes the process of an application based on the entered operation input signal.

As long as two hands are successively detected and a certain length of time has not elapsed since the change to one-hand or no-hand (no detected hand) (Step S106; No), the operation input signal creator 115 continues to create and output an operation input signal (Step S105).

Whereas, if a certain length of time has elapsed since change to one-hand or no-hand (Step S106; Yes), the processing proceeds to Step S108 in the case of change to one-hand (Step S107; Yes). The procedure ends in the case of change to no-hand (Step S107; No).

In Step S101, if the hand/finger image detector 112 does not detect two hands nearly simultaneously following the state of no detection of the hand 101, in other words does not start to detect two hands within a certain length of time (Step S101; No), the one-hand operation state is set (Step S108).

Figure 3:
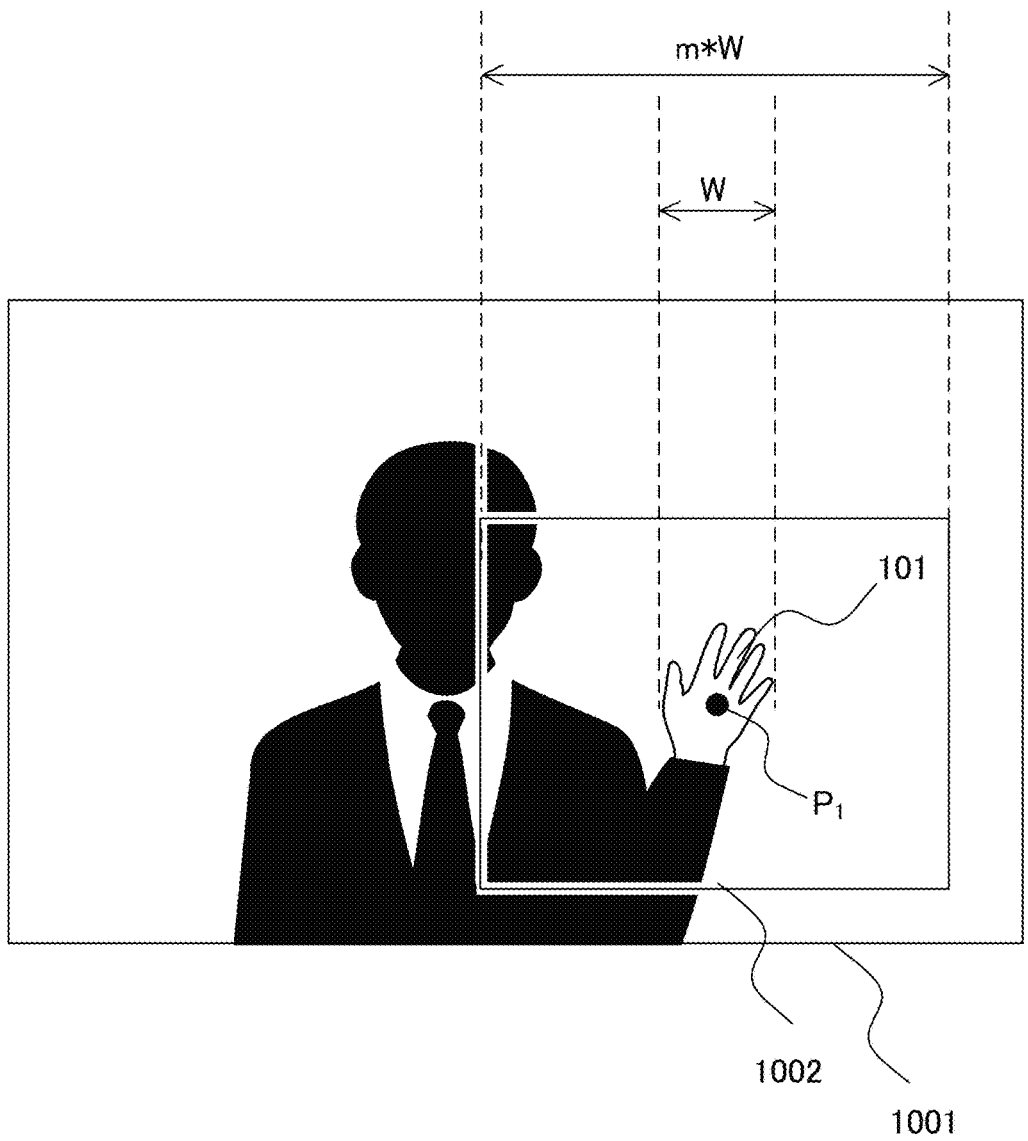
FIG. 3 is an illustration showing an operation region during the one-hand operation.

The operation region specifier 113 specifies a one-hand operation region 1002 as shown in the example of FIG. 3 (Step S109). The region map maker 114 maps the operation region 1002 specified by the operation region specifier 113 on the display region 1004 (Step S110).

Subsequently, the operation input signal creator 115 creates an operation input signal corresponding to change with time in the size, position, and shape of the one hand in the operation region 1002 mapped on the display region 1004, and outputs the operation input signal to the application executor 116 and the display 14 (Step S111). The display 14 moves the cursor or changes the shape of the cursor and the application executor 116 executes the process of an application based on the entered operation input signal.

As long as the one hand is successively detected and a certain length of time has not elapsed since the change to no-hand (Step S112; No), the operation input signal creator 115 continues to create and output an operation input signal (Step S111).

Whereas, if a certain length of time has elapsed since change to no-hand (Step S112; Yes), the procedure ends.

Specific examples of the display by the display 14 and the processing by the application executor 116 based on the operation input signals output in Steps S105 and S111 will be described below.

Figure 7:
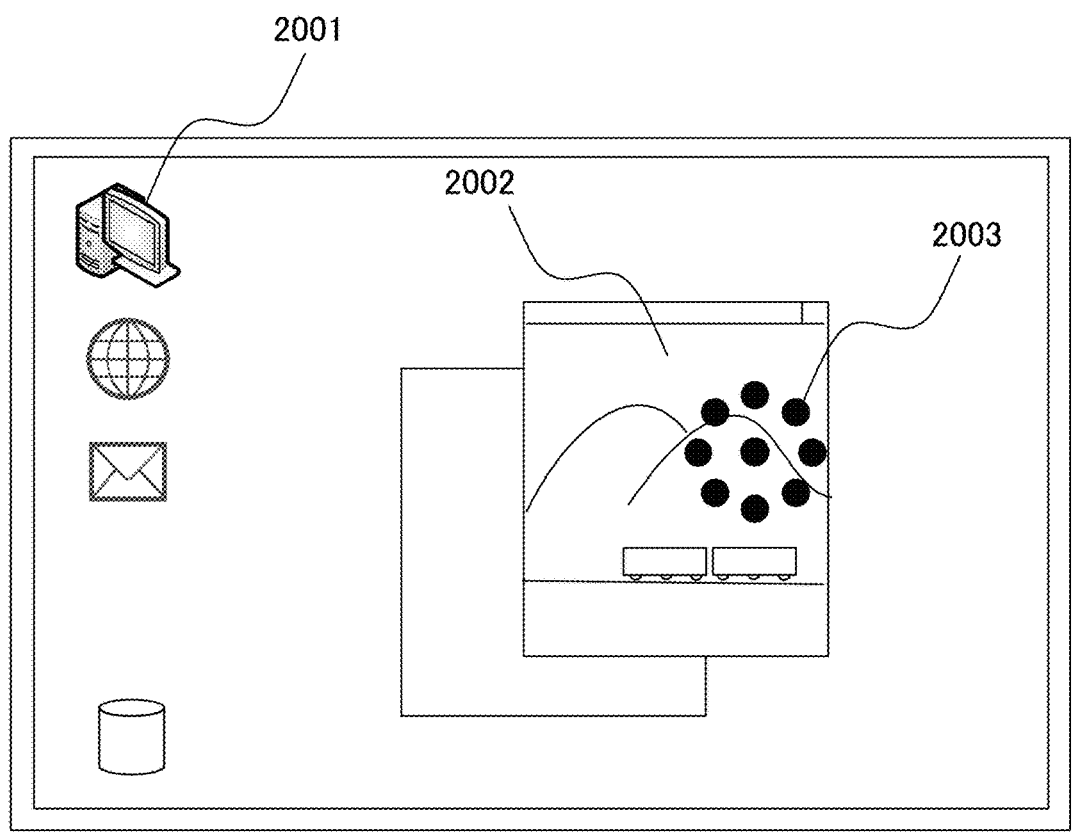
FIG. 7 is an illustration showing the display on which a virtual cursor is displayed.

The case in which an icon 2001 and an image 2002 as shown in FIG. 7 are displayed on the display 14 of the operation input device 10 is described. The image 2002 is displayed by an image display application. While the operator is placing the hand 101 in the field of view of the camera 12, the display 14 displays a cursor 2003 at the coordinate position converted with the mapping information.

It is desirable that the cursor 2003 has a shape allowing intuitive visual recognition of whether the operator's operation is reflected. In this embodiment, as displayed in the image in FIG. 7, the cursor 2003 comprising one circle and multiple circles arranged at equal intervals around the one circle is used.

The color of the cursor 2003 is changed depending on whether the cursor is situated at a position where the icon 2001 or the image 2002 can be selected. In the case of FIG. 7, since the cursor 2003 is situated at a position where the image 2002 displayed at the center can be selected, the circles of the cursor are black. When the cursor 2003 is situated outside the image 2002 and the selection is unavailable, the circles are white.

Figure 8A:
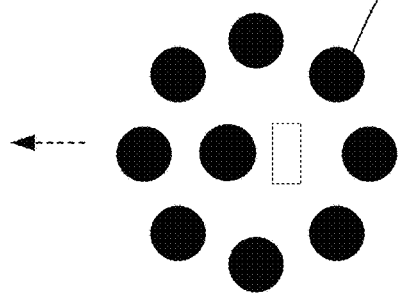
FIG. 8A is an illustration showing a moving cursor.
Figure 8B:
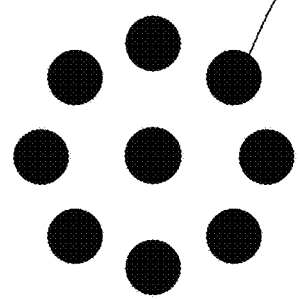
FIG. 8B is an illustration showing a cursor staying still.

Furthermore, while the cursor 2003 is moving, the center circle is displayed at a position shifted in the moving direction as shown in FIG. 8A. Whereas, when the cursor 2003 stays still, the center circle is situated at an equal distance from the centers of the surrounding circles as shown in FIG. 8B.

Figure 8C:
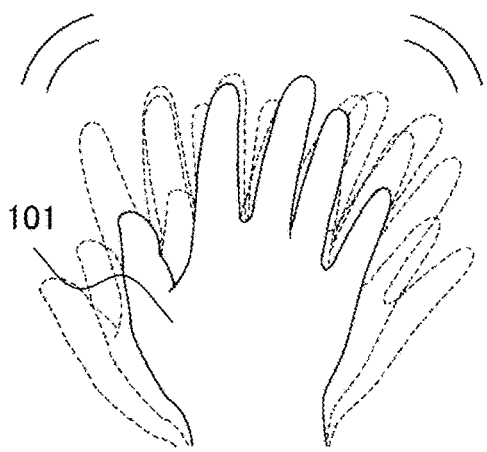
FIG. 8C is an illustration showing an example of the click operation.
Figure 8D:
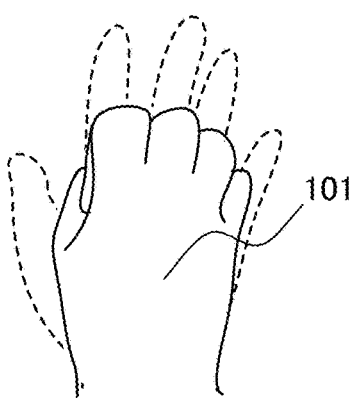
FIG. 8D is an illustration showing an example of the click operation.
Figure 8E:
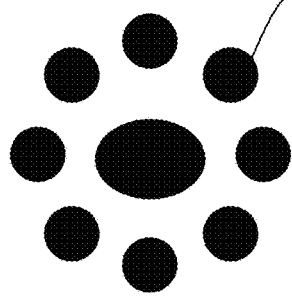
FIG. 8E is an illustration showing a cursor upon clicking.

It is desirable that the operator's click operation is a motion easy to identify. For example, the operator waves one hand to the right and to the left in small motions as shown in FIG. 8C. Alternatively, the operator makes a first from the open state as shown in FIG. 8D. Detecting such an operation, the operation input signal creator 115 determines that a click operation is conducted and extends the center circle of the cursor 2003 horizontally to an elliptical shape as shown in FIG. 8E. As a result, the operator can know that the click operation is identified.

Figure 9:
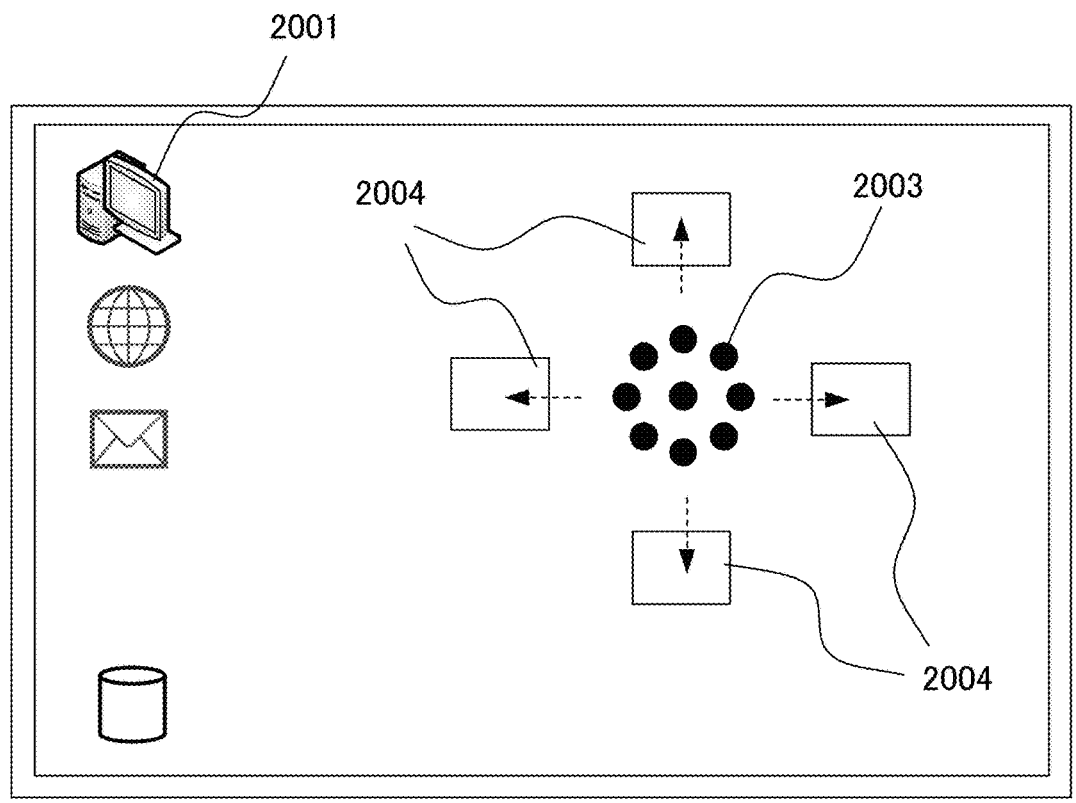
FIG. 9 is an illustration showing an operation to select a submenu.
Figure 9:
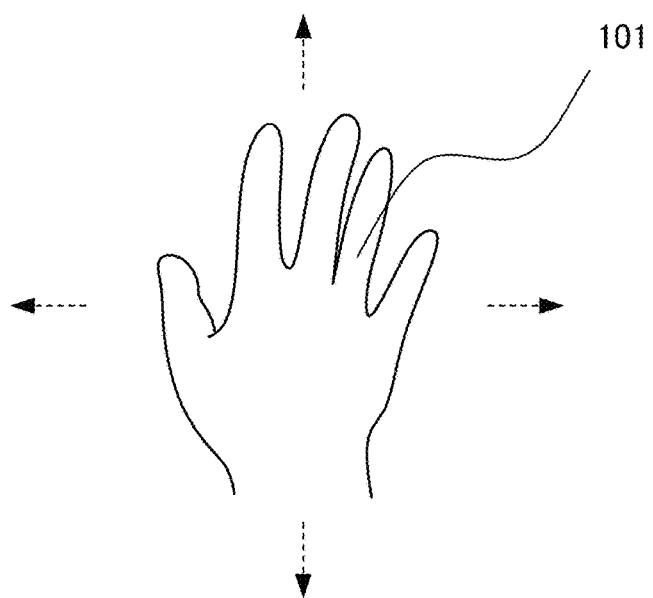

Furthermore, as shown in FIG. 9, virtual submenu buttons 2004 are displayed around the cursor 2003 when the hand 101 stays still for a certain length of time. The operator can move the cursor 2003 toward each submenu to select a submenu.

Figure 10:
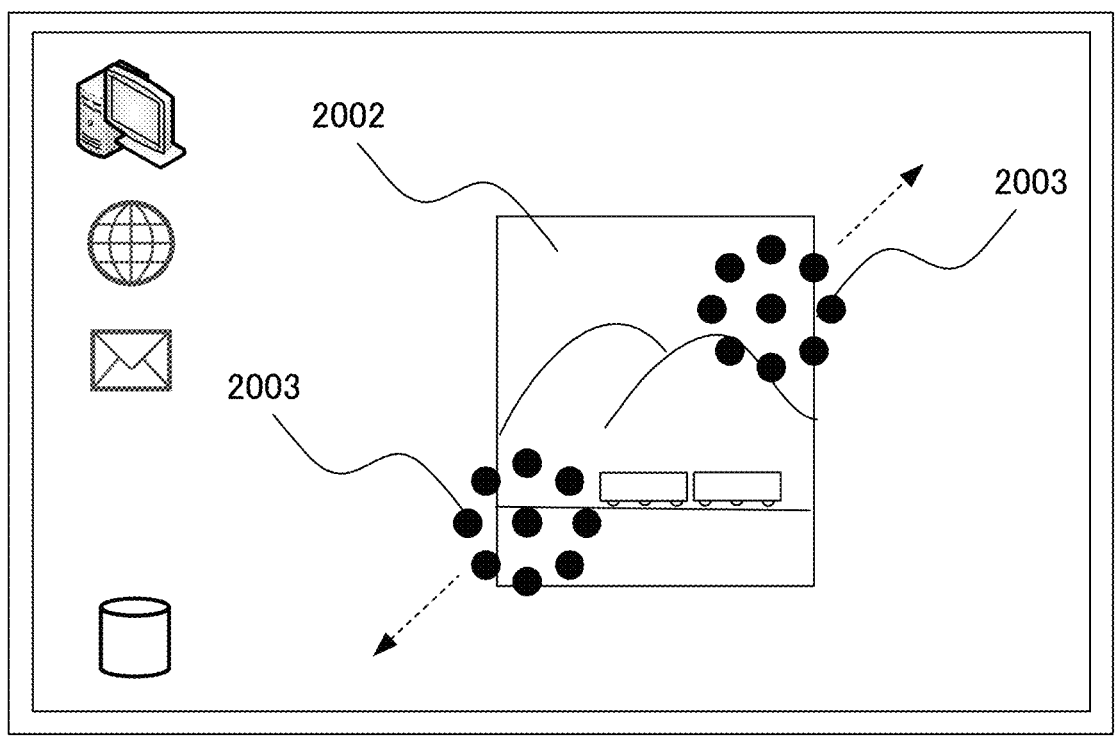
FIG. 10 is an illustration showing an operation to enlarge an image.
Figure 10:
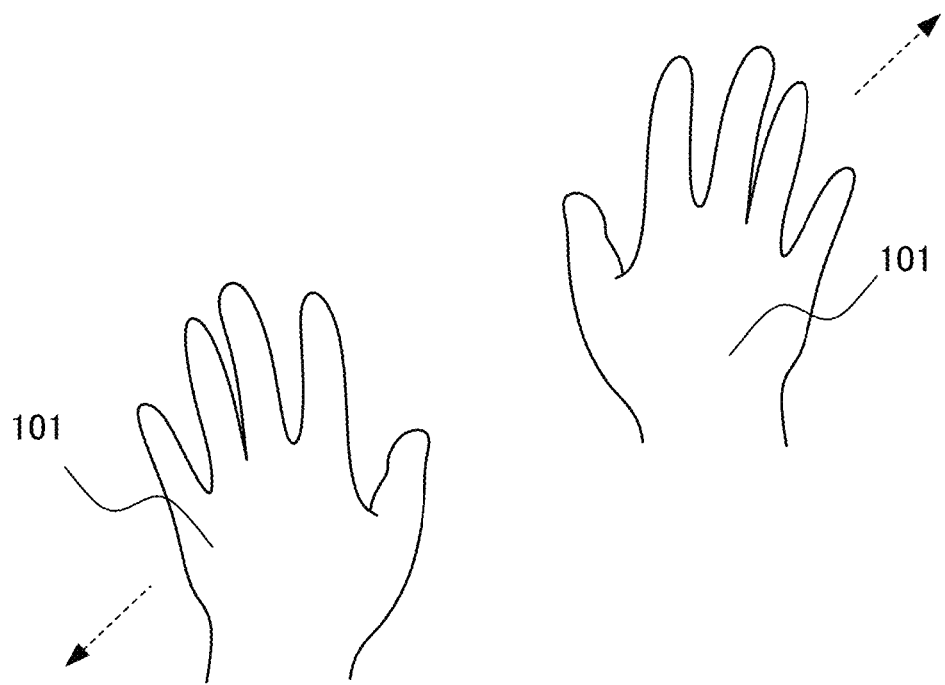

While the operator is placing two hands in the field of view of the camera 12, two cursors 2003 are displayed as shown in FIG. 10. The application executor 116 can execute the process corresponding to change in the relative position of the two cursors 2003. For example, when the two cursors 2003 are displayed within the image 2002 and moved away from each other as shown in FIG. 10, the process of enlarging the image 2002 (zooming in) is executed. Whereas, when the two cursors 2003 are moved closer to each other, the process of reducing the image 2002 (zooming out) is executed.

As another exemplary processing corresponding to change in the relative position of the two cursors 2003, only one of the cursors 2003 may be moved up or down for paging up or down. Furthermore, the two cursors 2003 may be rotated in the same direction about the midpoint between the two cursors 2003 so as to rotate the image 2002 in that direction.

In the example of FIG. 10, the image 2002 is enlarged/reduced by changing the relative position of the two cursors 2003 (the positions of two hands). However, the image 2002 may be enlarged/reduced according to the relative change in the size of the images of two hands. In other words, the process of zooming in or zooming out may be executed when one hand 101 is extended forward and it is determined that the size of that hand 101 is relatively larger, or one hand 101 is withdrawn backward and it is determined that the size of that hand 101 is relatively smaller. Furthermore, the image 2002 may be rotated about the Y-axis that runs in the vertical direction of the display 14 when it is determined that the relative sizes of the two hands have changed.

As described above, in this embodiment, the hand/finger image detector 112 detects a hand/finger image presenting a hand or finger of the operator from a frame image captured with a camera, and the operation region specifier 113 specifies an operation region 1002 or 1003 from the field of view of the camera 1001 based on the position and the size of the hand/finger image in the entire frame image. Then, the region map maker 114 maps the specified operation region 1002 or 1003 on the display region 1004. The operation input signal creator 115 acquires information of the position or size or shape of the hand/finger image in the mapped operation region 1002 or 1003 or information of the change with time in the position or size or shape, and creates and outputs an operation input signal based on such information. As a result, intuitive operation input matching the operator's intuition of operation is made possible regardless of the position of the operator.

Embodiment 2

Embodiment 2 of the present disclosure will be described in detail with reference to the drawings.

The operation input device 10 according to this embodiment has the same configuration and executes the same operation input procedure as in Embodiment 1 except that the hand/finger image detector 112 uses a different method of detecting a hand/finger image (hand 101). The method of detecting a hand/finger image will be described in detail.

Figure 11:
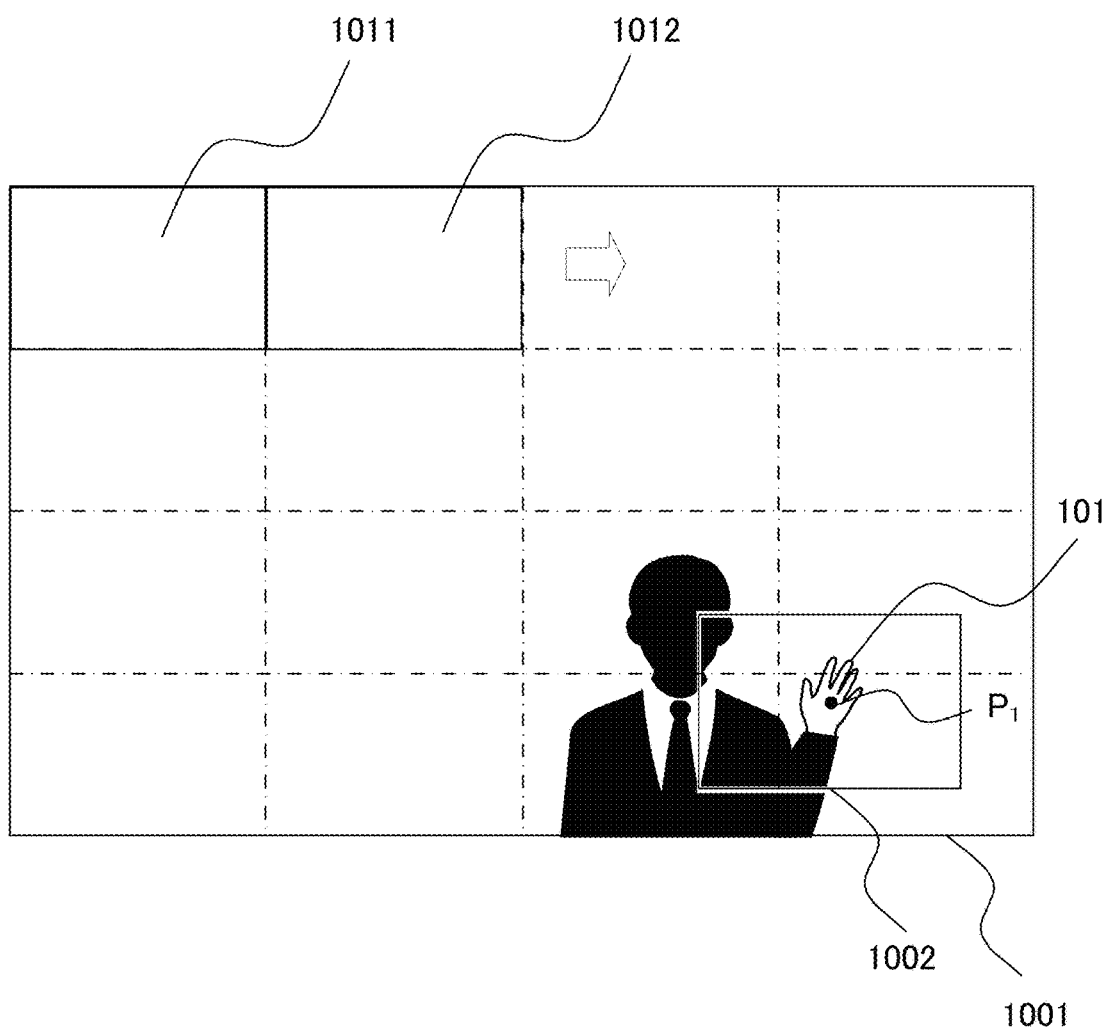
FIG. 11 is an illustration showing the divided regions of a frame image.

The hand/finger image detector 112 divides the frame image 1001 acquired by the image acquirer 111 into a predetermined number of regions. Then, the hand/finger image detector 112 searches the divided regions in sequence, detects a hand/finger image of a hand or finger of a person, and acquires information of the size and position of the detected hand or finger. For example, as shown in FIG. 11, the hand/finger image detector 112 searches divided regions 1011 and 1012 in this order and detects a hand/finger image. The method of detecting a hand/finger image in a divided region is the same as in Embodiment 1.

Information of the size, position, shape, and the like of the hand 101 detected by the hand/finger image detector 112 is output to the operation region specifier 113 and the operation input signal creator 115.

Here, if no hand/finger image is found in all of the divided regions, the divided regions 1011 and 1012 may be increased or decreased in size (in other words, the image is reduced or enlarged) and then a hand/finger image is searched for in the divided regions once again.

The operation region specifier 113 specifies the operation region 1002 or 1003 based on the position or size of the hand/finger image detected by the hand/finger image detector 112.

As described above, in this embodiment, the hand/finger image detector 112 searches in sequence the divided regions 1011 and 1012 obtained by dividing the frame image 1001 into a predetermined number of regions and detects a hand/finger image, and the operation region specifier 113 specifies an operation region based on the position or size of the detected hand/finger image. As a result, it is possible to detect a hand/finger image and specify an optimum operation region 1002 or 1003 even if the operator has moved forward or backward in the sight line direction of the camera and the size of the hand/finger image is largely changed.

Embodiment 3

Embodiment 3 of the present disclosure will be described in detail with reference to the drawings.

Figure 12:
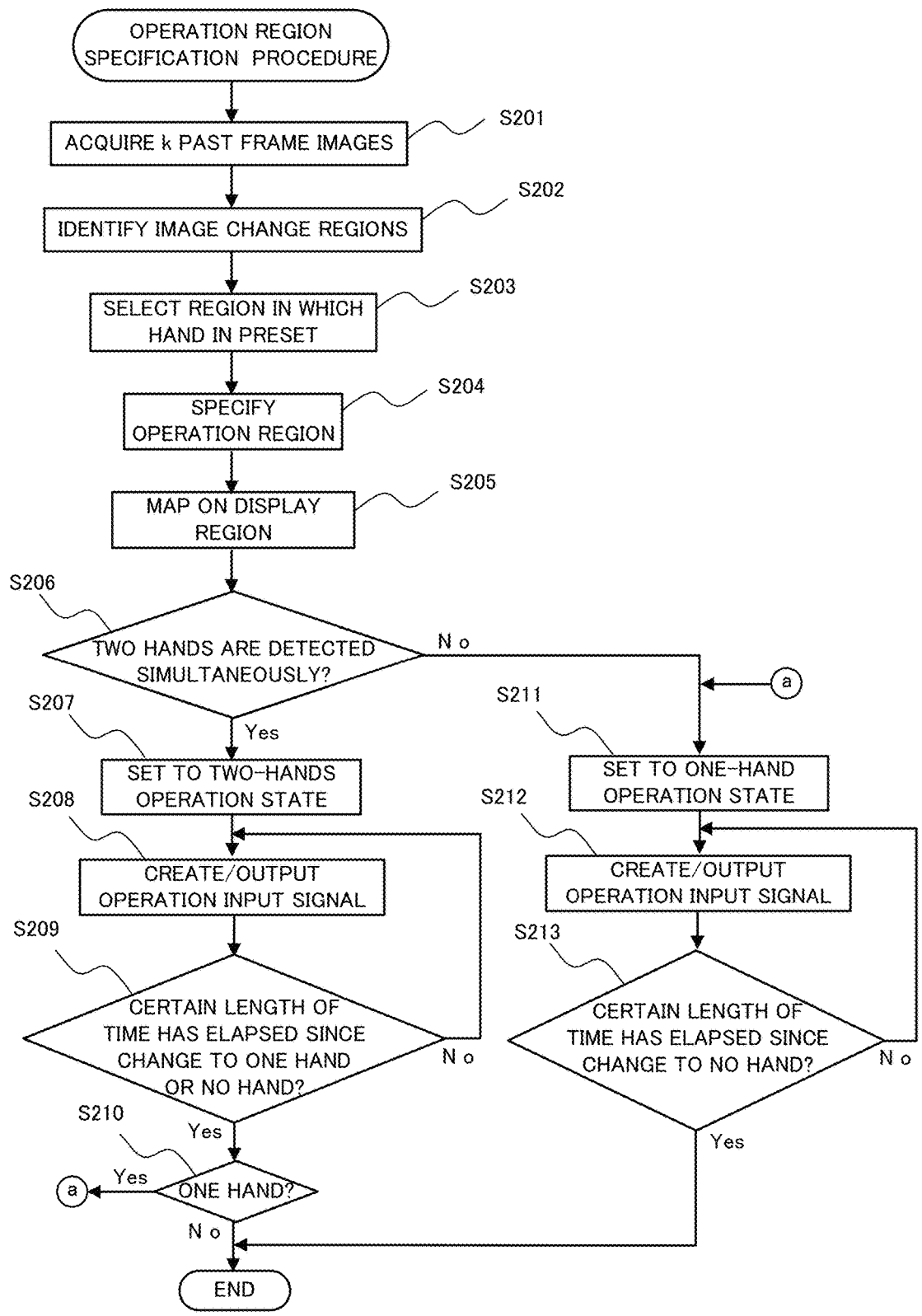
FIG. 12 is a flowchart of the operation region specification procedure according to Embodiment 3.

The operation input device 10 according to this embodiment has the same configuration as in Embodiment 1 but executes a different operation input procedure. Detailed explanation will be given along with the flowchart of FIG. 12.

The hand/finger image detector 112 acquires information of images of k consecutive past frames (k is an integer of 2 or higher) entered from the image acquirer 111 (Step S201). The hand/finger image detector 112 creates a histogram presenting the differences in pixel value between the frames from the images of the k consecutive past frames, and identifies image change regions in which significant change has occurred, in other words the differences in pixel value exceed a predetermined limit (Step S202).

The hand/finger image detector 112 selects a region in which a hand/finger image is present among the identified image change regions (Step S203). The method of searching the image change regions for a hand/finger image is the same as in Embodiment 1. Then, the operation region specifier 113 specifies a region of a predetermined size containing the selected region as the operation region 1002 or 1003 (Step S204).

Then, the region map maker 114 maps the operation region 1002 or 1003 specified in Step S204 on the display region 1004 (Step S205).

In the process of specifying the operation region 1002 or 1003 up to Step S204, if the hand/finger image detector 112 has detected two hands nearly simultaneously following the state of no detection of the hand 101, in other words has started to detect two hands within a given length of time (Step S206; Yes), the two-hand operation state is set (Step S207).

Subsequently, the operation input signal creator 115 creates an operation input signal corresponding to the change with time in the size, relative position, and shape of two hands in the operation region 1003 mapped on the display region 1004, and outputs the operation input signal to the application executor 116 and the display 14 (Step S208). The display 14 moves the cursor or changes the shape of the cursor and the application executor 116 executes the process of an application based on the entered operation input signal.

As long as two hands are successively detected and a certain length of time has not elapsed since the change to one-hand or no-hand (Step S209; No), the operation input signal creator 115 continues to create and output an operation input signal (Step S208).

Whereas, if a certain length of time has elapsed since change to one-hand or no-hand (Step S209; Yes), the processing proceeds to Step S211 in the case of change to one-hand (Step S210; Yes). The procedure ends in the case of change to no-hand (Step S210; No).

In Step S206, if the hand/finger image detector 112 does not detect two hands nearly simultaneously following the state of no detection of the hand 101, in other words does not start to detect two hands within a given length of time (Step S206; No), the one-hand operation state is set (Step S211).

Subsequently, the operation input signal creator 115 creates an operation input signal corresponding to the change with time in the size, position, and shape of the one hand in the operation region 1002 mapped on the display region 1004, and outputs the operation input signal to the application executor 116 and the display 14 (Step S212). The display 14 moves the cursor or changes the shape of the cursor and the application executor 116 executes the process of an application based on the entered operation input signal.

As long as one hand is successively detected and a certain length of time has not elapsed since the change to no-hand (Step S213; No), the operation input signal creator 115 continues to create and output an operation input signal (Step S212).

Whereas, if a certain length of time has elapsed since change to no-hand (Step S213; Yes), the procedure ends.

As described above, in this embodiment, the operation region specifier 113 identifies image change regions in which the differences in pixel value between frames exceed a predetermined limit from multiple consecutive frame images, and specifies as the operation region a region containing a region in which a hand/finger image is present among the image change regions. As a result, it is possible to specify an operation region more accurately and conduct proper region mapping and, furthermore, operation input matching the operator's intuition of operation is made possible.

Embodiment 4

Embodiment 4 of the present disclosure will be described in detail with reference to the drawings.

Figure 6:
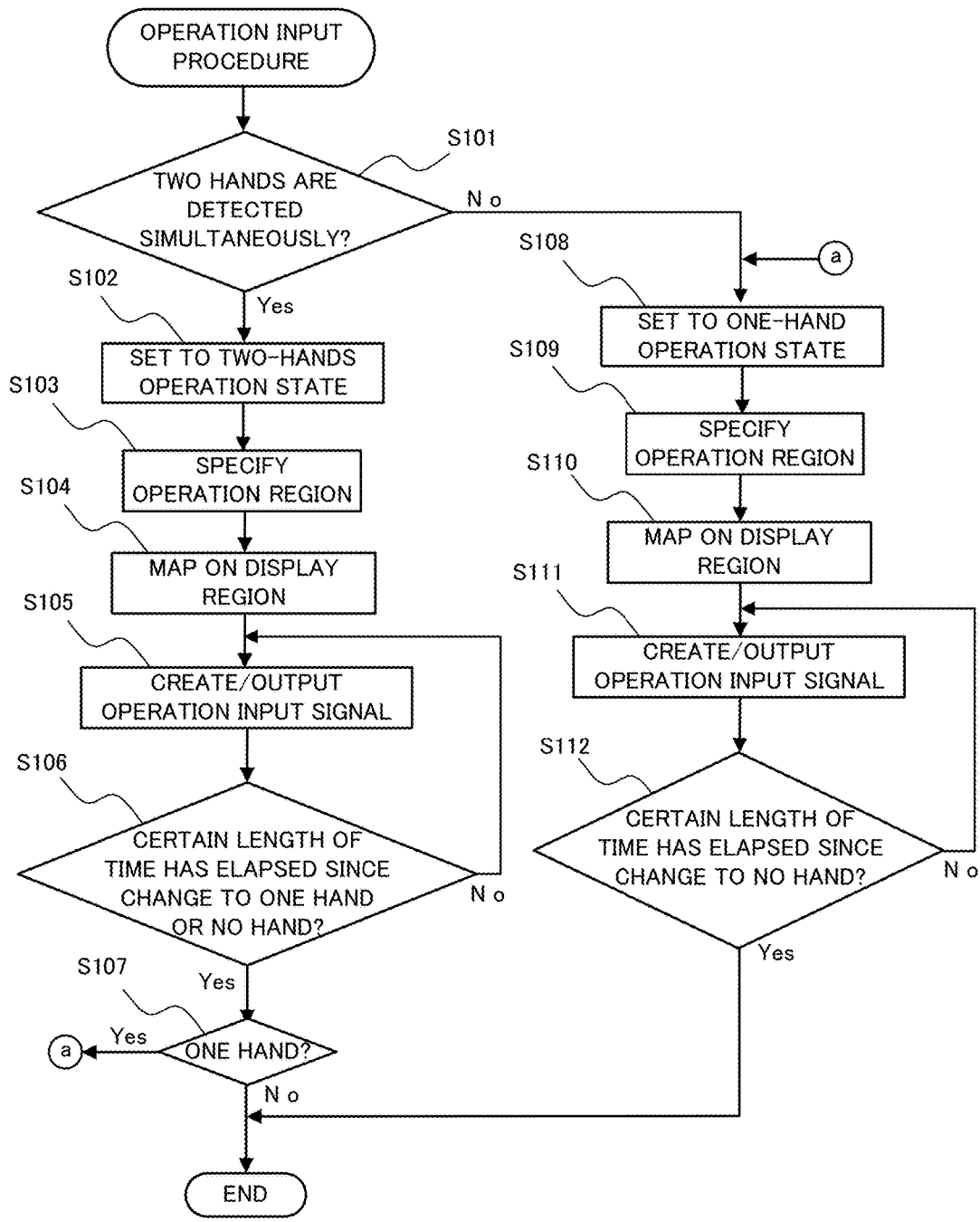
FIG. 6 is a flowchart of the operation input procedure.

The operation input device 10 according to this embodiment has the same configuration and executes the same operation input procedure as in Embodiment 1 or 2 except that the mapping method executed by the region map maker 114 in Steps S104 and S110 of FIG. 6 is modified. The mapping method will be described in detail.

The operation region specifier 113 specifies a one-hand operation region 1002 or two-hand operation region 1003 as in Embodiment 1 or 2.

Figure 13A:
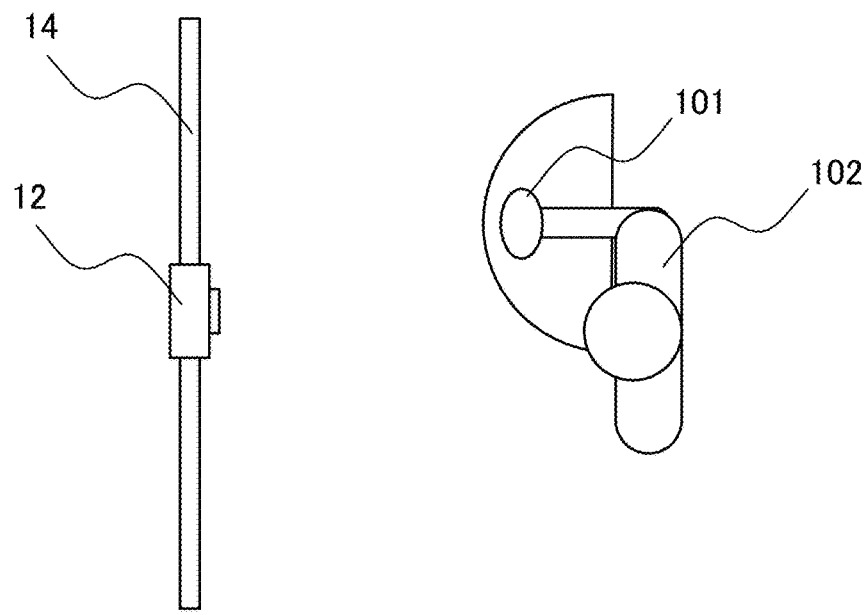
FIG. 13A is an illustration showing the display and operator seen from above.

Here, as shown in FIG. 13A, since a person moves his arm about the elbow or shoulder, the hand 101 moves on a spherical shell about the elbow or shoulder. Therefore, when the hand is situated in the center portion of the operation region 1002 or 1003, in other words when the hand 101 is situated in front of the person's chest, the moving distance of a hand/finger image detected by the hand/finger image detector 112 is nearly proportional to the actual moving distance of the hand. However, when the hand 101 is situated at an end of the operation region 1002 or 1003, in other words when the hand is situated away from the person's body 102, the moving distance of a hand/finger image is smaller than the actual moving distance of the hand.

Figure 13B:
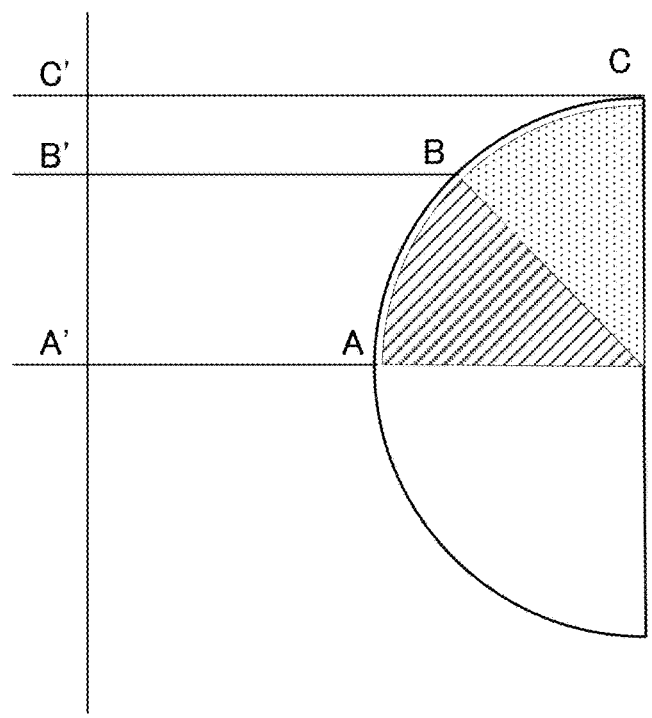
FIG. 13B is an illustration showing the relationship between the operator's hand position and the hand position identified by the camera.

The above matter is explained using FIG. 13B as follows. When a person moves his hand from A to B, a hand/finger image moves from A' to B'. Whereas, when the person moves his hand from B to C, a hand/finger image moves from B' to C'. Although the length of the arc between A and B and the length of the arc between B and C are equal, the distance between B' and C is relatively shorter than the distance between A' and B'.

Because of this difference between the actual moving distance of the hand and the moving distance of a hand/finger image, mismatch between the operator's intuition and the cursor movement occurs. In order to eliminate such mismatch, the region map maker 114 assumes and maps on the display region a virtual space of a convex plane within the operation region 1002 or 1003.

Figure 14:
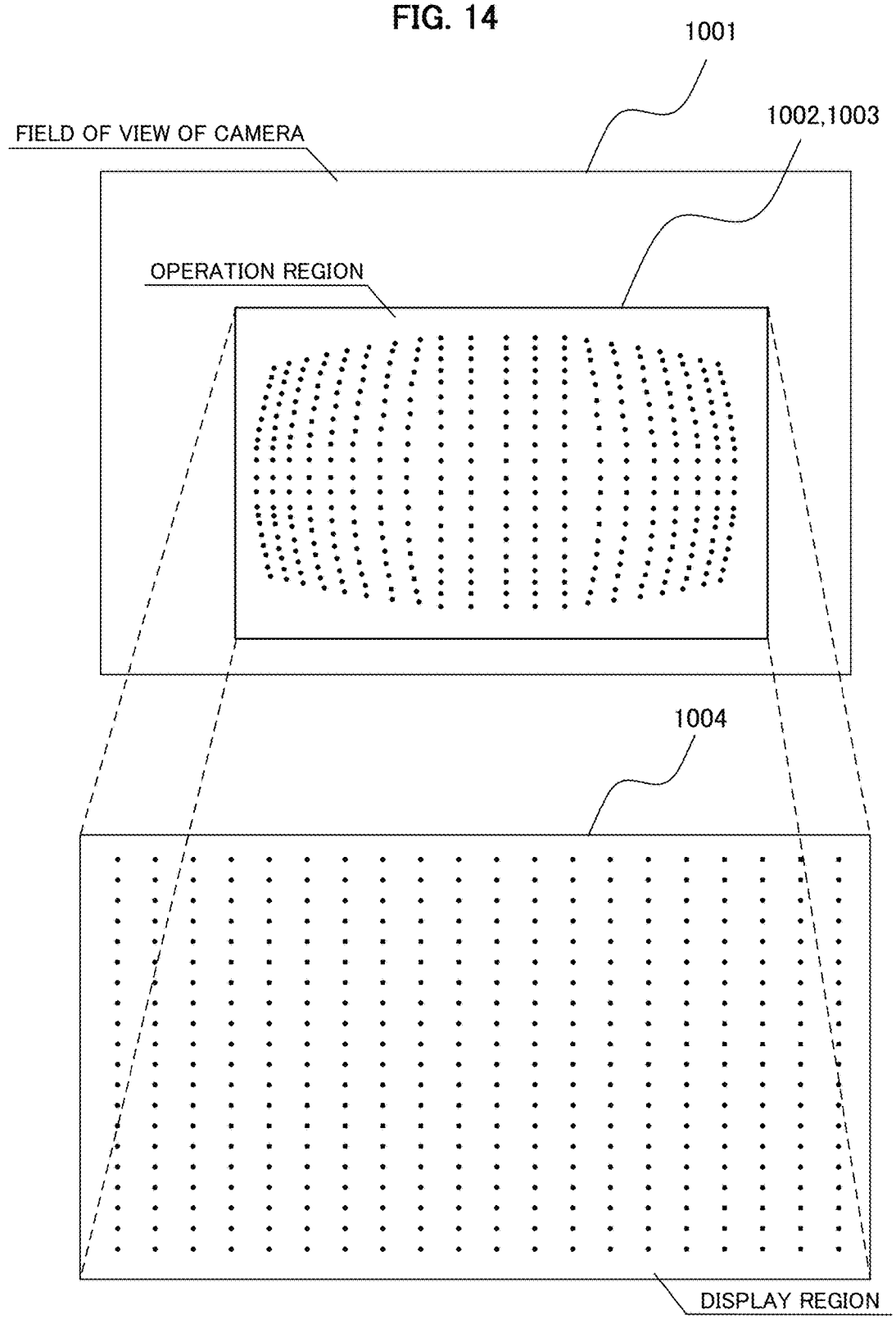
FIG. 14 is an illustration showing the mapping between the operation region and the display region according to Embodiment 4.

More specifically, the region map maker 114 assumes, as shown in FIG. 14, such an array of points within the operation region 1002 or 1003 as a convex plane on which points are arrayed at certain intervals in each of the vertical and horizontal directions as seen from the convex direction. In other words, the region map maker 114 assumes an array of points arrayed on a convex plane at certain intervals in each of the vertical and horizontal directions and projected from the convex direction on a plane perpendicular to the convex direction.

The assumed points within the operation region 1002 or 1003 and the same number of points as the points within the operation region 1002 or 1003 that are arrayed at certain intervals in each of the vertical and horizontal directions within the display region 1004 are associated in the arrayed order. Then, mapping information associating the coordinates of the points within the operation region 1002 or 1003 with the coordinates of the points within the display region 1004 is created. When this mapping information is used, the mapping is conducted in the manner that the enlargement ratio of the display region 1004 to the operation region 1002 or 1003 is increased from the center to the ends of the operation region 1002 or 1003.

Using the mapping information created as described above makes it possible to reduce the mismatch between the operator's intuition of operation and the cursor movement.

The operation input signal creator 115 creates an operation input signal indicated by the operator's operation based on information of the change in the size, position, shape of the image of the hand 101 detected by the hand/finger image detector 112 and the mapping information created by the region map maker 114.

As described above, in this embodiment, the region map maker 114 creates mapping information associating the coordinates of an array of points within the operation region 1002 or 1003 that are arrayed on a virtual convex plane at certain intervals and projected from the convex direction with the coordinates of points within the display region 1004 that are arrayed at certain intervals in the vertical and horizontal directions, and the mapping information is used in detecting the operators operation. As a result, operation input matching the operators intuition of operation is made possible.

As described above, the present disclosure detects a hand/finger image presenting a hand or finger of the operator from a frame image captured by a camera, maps an operation region in which the operators operation is effective within the field of view of the camera on the display region of the display, and creates mapping information presenting the correspondence of coordinates between the operation region and the display region. Then, the coordinates of the hand/finger image in the operation region are converted to the coordinates in the display region using the mapping information, and an operation input signal presenting the operators operation input is created based on the position or size or shape of the hand/finger image at the converted coordinates. As a result, intuitive operation input matching the operators intuition of operation is made possible regardless of the position of the operator.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

For example, the operation region specifier 113 specifies an operation region 1002 or 1003 based on the center position and width of one hand or the center position of two hands. However, the operation region specifier 113 may specify an operation region 1002 or 1003 based on positional information of some other parts. As an example, the vertical length of an operation region 1002 or 1003 may be determined by recognizing the face of a person and using the vertical distance between the center position of the face and the center position of a hand.

Furthermore, the operation region specifier 113 specifies a rectangular operation region 1002 or 1003. However, the operation region specifier 113 may specify a trapezoidal operation region on the assumption that the surface of the display 14 and the body axis of the operator may not be parallel.

Furthermore, the hand/finger image detector 112 detects an image of a hand with all fingers and the thumb spread. However, the hand/finger image detector 112 may detect an image of a hand in another state. For example, the hand/finger image detector 112 may detect an image of a hand with only one or two fingers raised. In such a case, a click operation may be identified when the state of only one or two fingers being raised is changed to the state of all fingers and the thumb being spread.

Furthermore, in Embodiment 3, the hand/finger image detector 112 identifies image change regions in which the pixel values largely change in the images of k consecutive past frames. However, the hand/finger image detector 112 may divide the frame image 1001 into a predetermined number of regions as in Embodiment 2 and identify image change regions in the divided regions selected in sequence.

Furthermore, it is possible to make an existing information terminal such as a computer function as the operation input device 10 according to the present disclosure by making the information terminal execute the program for the procedure executed by the CPU 11.

The above program can be distributed by any method and may be stored and distributed on a non-transitory computer-readable recording medium such as a compact disc read only memory (CD-ROM), a digital versatile disc (DVD), a magneto-optical disc (MO), and a flash memory, or distributed via a communication network such as the Internet.

The present application is based on Japanese Patent Application No. 2014-264546, filed on Dec. 26, 2014, the specification, scope of claims, and drawings of which are all incorporated herein by reference.

REFERENCE SIGNS LIST

10 Operation input device
11 CPU
111 Image acquirer
112 Hand/finger image detector
113 Operation region specifier
114 Region map maker
115 Operation input signal creator
116 Application executor
12 Camera
13 RAM
14 Display
15 Storage
101 Hand
102 Body
1001 Field of view of camera
1002, 1003 Operation region
1004 Display region
1011, 1012 Divided region
2001 Icon
2002 Image
2003 Cursor
2004 Virtual button

The invention claimed is:

1. An operation input device, comprising:
a display;
a camera capturing an image of an operator;
a hand/finger image detector acquiring a frame image captured by the camera, and detecting a hand/finger image presenting a hand or finger of the operator from the frame image;
an operation region specifier specifying an operation region in which the operator's operation is effective from a field of view of the camera based on the position or size in the frame image of the hand/finger image detected by the hand/finger image detector;
a region map maker mapping the operation region specified by the operation region specifier on a display region of the display, wherein the region map maker conducts the mapping in a manner that an enlargement ratio of the display region to the operation region is increased from a center of the operation region to ends of the operation region, and creating mapping information presenting a correspondence of coordinates between the operation region and the display region;
an operation input signal creator converting the coordinates in the operation region of the hand/finger image detected by the hand/finger image detector to the coordinates in the display region using the mapping information, and creating an operation input signal presenting the operator's operation input based on the position or size or shape of the hand/finger image at the converted coordinates.

2. The operation input device according to claim 1, wherein the operation region specifier identifies as the operation region a region in which the hand/finger image is present from regions in which the image changes exceeding a predetermined limit in multiple consecutive frame images.

3. The operation input device according to claim 1, wherein
the hand/finger image detector divides the frame image into a predetermined number of divided regions, searches the divided regions in sequence, and detects the hand/finger image.

4. The operation input device according to claim 3, wherein
the hand/finger image detector enlarges or reduces the image in the divided regions to detect the hand/finger image when the hand/finger image is not detected in the divided regions.

5. The operation input device according to claim 1, wherein
the region map maker assumes in the operation region an array of points arrayed on a convex plane at certain intervals and projected from the convex direction, arrays the same number of points as the points assumed in the operation region in the display region at certain intervals, and creates mapping information associating the coordinates of the points arrayed in the operation region with the coordinates of the points arrayed in the display region.

6. The operation input device according to claim 1, wherein
the operation input signal creator converts the coordinates of the hand/finger image in the operation region to the coordinates in the display region of the display using the mapping information, and displays a cursor at the converted position of the hand/finger image.

7. The operation input device according to claim 6, wherein
the operation input signal creator displays the cursor in a fashion that makes it possible to recognize that the operator's hand is moving when the operation input signal creator detects change in the position of the hand/finger image, and displays the cursor in a fashion that makes it possible to recognize that the operator has conducted a click operation when the operation input signal creator detects a given change in the shape of the hand/finger image.

8. The operation input device according to claim 1, wherein
the hand/finger image detector detects two of the hand/finger images from the frame image, and
the operation input signal creator creates the operation input signal for rotation about a Z-axis perpendicular to the display surface of the display or for scrolling up or scrolling down when the two hand/finger images detected by the hand/finger image detector relatively change in the coordinates in the vertical direction of the display.

9. The operation input device according to claim 1, wherein
the hand/finger image detector detects two of the hand/finger images from the frame image, and
the operation input signal creator creates the operation input signal for rotation about a Y-axis that runs in the vertical direction of the display or for zooming in or zooming out when the two hand/finger images detected by the hand/finger image detector relatively change in size.

10. An operation input method for a computer connected to a camera and a display to enter an operation of an operator based on a hand/finger image presenting a hand or finger of the operator captured by the camera, comprising:
a hand/finger image detection step of acquiring a frame image captured by the camera, and detecting a hand/finger image presenting a hand or finger of the operator from the frame image;
an operation region specification step of specifying an operation region in which the operator's operation is effective from a field of view of the camera based on the position or size in the frame image of the hand/finger image detected in the hand/finger image detection step;
a region mapping step of mapping the operation region specified in the operation region specification step on a display region of the display, and creating mapping information presenting the correspondence of coordinates between the operation region and the display region, the step further comprising mapping in a manner that an enlargement ratio of the display region to the operation region is increased from a center of the operation region to an end of the operation region; and
an operation input signal creation step of converting the coordinates in the operation region of the hand/finger image detected in the hand/finger image detection step to the coordinates in the display region using the mapping information, and creating an operation input signal presenting the operator's operation input based on the position or size or shape of the hand/finger image at the converted coordinates.

11. A non-transitory computer readable recording medium on which a program is recorded that when executed by a processor on a computer allows it to function as:
a hand/finger image detector acquiring a frame image captured by the camera, and detecting a hand/finger image presenting a hand or finger of an operator from the frame image;
an operation region specifier specifying an operation region in which the operator's operation is effective from a field of view of the camera based on the position or size in the frame image of the hand/finger image detected by the hand/finger image detector;
a region map maker mapping the operation region specified by the operation region specifier on a display region of the display, and creating mapping information presenting the correspondence of coordinates between the operation region and the display region;
an operation input signal creator converting the coordinates in the operation region of the hand/finger image detected by the hand/finger image detector to the coordinates in the display region using the mapping information, and creating an operation input signal presenting the operator's operation input based on the position or size or shape of the hand/finger image at the converted coordinates, and
wherein the region map maker conducts the mapping in a manner that an enlargement ratio of the display region to the operation region is increased from a center of the operation region to ends of the operation region.

* * * * *